United States Patent [19]

Pendergrast

[11] 3,882,232
[45] May 6, 1975

[54] METHOD OF COMBATING HYPOMAGNESEMIA IN CATTLE
[75] Inventor: Robert A. Pendergrast, Atlanta, Ga.
[73] Assignee: United States Steel Corporation, Pittsburgh, Pa.
[22] Filed: Sept. 13, 1973
[21] Appl. No.: 396,951

[52] U.S. Cl. .............................................. 424/158
[51] Int. Cl. .......................................... A61k 27/00
[58] Field of Search ........................... 424/357, 158

[56] References Cited
UNITED STATES PATENTS
2,004,788   6/1935   Green ................................ 424/357

OTHER PUBLICATIONS

Miller et al., Encyclopedia of Animal Care (1962), page. 436.

Primary Examiner—Sam Rosen
Attorney, Agent, or Firm—William L. Krayer

[57] ABSTRACT

Mixtures of finely divided magnesia and bentonite are found to have the ability to adhere to grass even through rain. Such mixtures applied to pastures in early spring are successful in combating hypomagnesemia in cattle.

7 Claims, No Drawings

METHOD OF COMBATING HYPOMAGNESEMIA IN CATTLE

BACKGROUND OF THE INVENTION

Grass tetany is a condition in cattle brought about by an inadequate level of magnesium in the blood serum, or hypomagnesemia. Cattle most frequently develop grass tetany soon after they are moved from a diet of hay and supplements to rapidly growing young pasture. The onset of symptoms is sudden, and death follows in a matter of hours unless immediate treatment by intravenous injection of soluble magnesium compounds is administered. Considerable effort has been expended to find a preventive measure rather than emergency treatment after the fact. Intensive land management practices have served to increase the incidence of grass tetany. One of the effects of heavy applications of fertilizer, particularly potash, to pasture is to decrease the magnesium content of the grass, and it has been clearly shown that such applications of fertilizer increase the incidence of grass tetany.

Grunes et al., *Advances in Agronomy*, 22, pages 331–374 (1970) concluded that it was economically unfeasible to raise the magnesium content of grass by fertilization with magnesium compounds. This article contains an excellent review of the literature on hypomagnesemia. Grass tetany occurs most frequently on grasses accomplishing most of their growth in cool weather, such as in early spring.

Preventive treatment against grass tetany in dairy cows is relatively simple since they are fed supplements which may be fortified with magnesium compounds. The primary concern is for a preventive treatment for beef cattle on pasture, but the problem is complicated by the effects on magnesium levels in the grass caused by the presence of other common nutrients, particularly as introduced by fertilizer.

Horvath and Todd, *Proc. 23rd Ann. Texas Nutr. Conf.* pages 96–104 (1968) reviewed various methods of oral supplementation of magnesium for cattle. Mixtures of salt and magnesia as free choice supplementation are effective, but there is a time of adaptation before such mixtures will be voluntarily consumed, and they are of little value when the animals are first turned out to pasture. Magnesium compounds admixed with a vehicle of liquid molasses have been shown to be somewhat effective, *Control of Hypomagnesemia in Cows*, Rogers, P. A. M. and Poole, D. B. R., Irish Vet. J., 25(10), pages 197–202 (1971), but there was a wide variation in individual consumption of the mixtures which gave erratic control of the disease. Rogers and Poole reported success when magnesium oxide was dusted on pasture, but the effect was short-lived as rain easily washed the magnesium oxide off the grass blades.

SUMMARY OF THE INVENTION

The control measure sought after was a material containing magnesium which (1) could be applied to pasture foliage prior to first turning cows out to graze, (2) could be spread thinly and uniformly over the pasture grass so that no cow could avoid an ingestion of magnesium in proportion to the quantity of fresh forage consumed, (3) would not be unpalatable so as not to diminish the quantity of grass consumed, and (4) would adhere to the grass foilage so that rain would not remove it from the foliage before it was entirely or almost entirely consumed. To this end, magnesium oxide and bentonite clay were used which, on being added to water, either already mixed together or added serially to the water, could be sprayed on pasture grasses so that few if any blades were untouched by one or more drops of the suspension of magnesia and bentonite in water. The drops after drying for a period up to twelve hours, formed a white tenacious coating as clearly visible speckles against the green background of the grass blades. This coating survived repeated rains without being washed from the grass blades.

The preferred quantity of MgO to be applied per acre of pasture was derived by calculation from several known numerical values:

1. Two ounces MgO per head each day has been demonstrated to prevent grass tetany in all cases,
2. a cow on pasture will consume daily 2 pounds dry matter per 100 pounds body weight, and
3. an average pasture will supply 500 pounds dry matter per acre.

From the above numbers and the assumption of 1,000 pounds live weight per head, it may be seen that 3.12 pounds MgO per acre of pasture will supply the known preventive level of magnesium if it is totally recovered by grazing. Initial tests were made at a rate of thirty pounds MgO per acre to allow for an unknown efficiency factor.

EXAMPLE I

Two suspensions, each containing 15% MgO, were prepared, designated A and B.

| Material | Weight, % A | B |
|---|---|---|
| Water | 52 | 83 |
| Bentonite | 3 | 2 |
| Molasses | 30 | 0 |
| MgO | 15 | 15 |

Both specimens exhibited thixotropy.

A quantity of molasses was included in one mixture on the theory that when applied to a winter-killed stand of Bermuda grass pasture the sweetness of the molasses would encourage cows to consume the dry grass. The dry winter-killed grass is nutritious but is less appealing than a succulent stand of a cool season grass with which it may have been overseeded. Where the two grasses are mixed, the green grass is consumed while the dry grass is simply trampled down and wasted.

Each mixture was sprayed on a test patch of Kentucky 31 Fescue. Twenty-three hours later each patch was sprayed with water from an atomizer bottle, with the results that the coating containing molasses was washed off while that without molasses (B) did not wash off. Preparation (B) later survived 24 hours of continuous rain without visible loss.

Example II

Formulation C, shown below, was prepared. It contained 10% MgO and 1.5% bentonite, by weight.

Preparation C

| Material | Parts by Weight |
|---|---|
| Water | 4.425 |
| Bentonite | 75 |
| Magox 98 HR (MgO) | 500 |

A portion of mixture of Preparation C was applied to pasture on which a herd of Aberdeen Angus yearlings were subsequently allowed to graze. Alternate strips of pasture were sprayed at 500 pounds slurry per acre, and the grazing pattern of the herd was observed. Distribution of the cattle was random over treated and untreated swaths, indicating no change in palatability due to the treatment.

Example III

In this test, Formulation C was applied to a section of pasture at the rate of 300 pounds per acre, sufficient to provide 30 pounds of MgO per acre.

Observations were made as to the laxative effect of the magnesia. A comparison of fecal droppings of cows on untreated pasture with those of cows grazing on treated pasture was made. There was no measurable laxative effect due to the magnesia on the treated area.

Example IV

The tests reported in this example were made in cooperation with and under the direction of personnel at the United States Department of Agriculture, Southern Piedmont Conservation Research Center, Watkinsville, Ga.

The effectiveness of a MgO-bentonite-water slurry in preventing hypomagnesemia and grass tentany was evaluated. Specifically, the experiment was conducted to compare the blood serum levels of cows on treated and untreated pasture using Formulation C of Example II. The composition of the slurry was 10% MgO and 1.50% bentonite. The slurry was applied with a suspension fertilizer applicator at a rate of 23.2 pounds MgO per acre on a 11.0 acre Kentucky-31 tall fescue pasture stocked with 11 cows, 8 of which were lactating. The control pasture consisted of 10.0 acres of Kentucky 31 tall fescue stocked with 10 cows, 7 of which were lactating. The period of the tetany trial was Mar. 9 to May 5, 1972. Cows were randomly assigned to each treatment group on the basis of age, pregnancy status, and pretrial magnesium levels (blood sampling dates of Feb. 9 and Mar. 3, 1972). Blood samples from each cow were obtained immediately before the treatments were imposed on Mar. 9, 1972 and on Mar. 15, 23 and 29, Apr. 5 and May 4, 1972. Pastures used for each treatment group had been fertilized for approximately 3½ years at a rate of 22.4 metric tons of broiler litter per hectare per year. There was no supplemental feed supplied during this period. Rainfall was as follows:

Rainfall: 3/9/72 - 4/5/72

|       | Inches |
|-------|--------|
| 3/14  | 0.02   |
| 3/16  | 0.57   |
| 3/18  | 0.10   |
| 3/22  | 0.29   |
| 3/25  | 0.02   |
| 3/27  | 0.02   |
| 3/28  | 0.20   |
| 3/29  | 0.40   |
| 3/30  | 0.15   |
| 3/31  | 0.39   |
| 4/4   | 0.04   |
|       | 2.20   |

The effectiveness of the slurry treatment was evaluated by measuring blood serum Mg levels, noting the occurrence of hypomagnesemia among the cows (blood serum levels of 1.6 milligrams per 100 milliliters or less), and the prevention of grass tetany.

The treatment effects were significantly different with the MgO-bentonite slurry treatment, resulting in greatly increased blood serum Mg levels on the 15th, 23rd and 29th days despite the relatively heavy rainfall on the 7th and 13th days. In addition, one cow in the control group died on the 19th day from grass tetany. This cow had blood serum Mg levels of 0.70, 0.65 and 0.59 milligrams per 100 milliliter on the 3rd, 9th, and 15th days, respectively. Symptoms associated with the cow's death were typical of grass tetany. These results indicate the grass was tetanigenic in the control pasture and that the slurry treatment was effective in elevating blood serum Mg levels and in preventing grass tetany. There were no cows grazing the treated grass with blood serum Mg levels less than 1.6 milligrams per 100 milliliter, while there were still hypomagnesemic cows in the control group on the 36th day. After the 15th day, blood serum Mg levels increased, and the proportion of hypomagnesemic cows in the control group decreased with time, illustrating the passing of the grass tetany season (see Table I). Standard deviations of blood serum Mg levels of cows on the slurry treatment were less than half of those of the control group on March 15, 23 and 29. Therefore, an important effect of the slurry treatment was that of insuring consumption of Mg by all cows as indicated by the reduced variation among animals on the slurry treatment.

Table I

Proportion of Cows in Each Treatment Group with Blood Serum Magnesium Less than 1.6 mg/100 ml.

| Sampling Date    | Control | Slurry |
|------------------|---------|--------|
| 3/9 and Pretrial | 16/30   | 21/33  |
| 3/15/72          | 7/10    | 0/11   |
| 3/23/72          | 6/9¹    | 0/11   |
| 3/29/72          | 4/9     | 0/11   |
| 4/5/72           | 2/9     | 0/11   |
| 5/4/72           | 0/9     | 0/11   |

¹One death because of tetany on March 19.

Thus, it may be seen that my invention is a method for combating hypomagnesemia and inhibiting the incidence of grass tetany in grazing animals comprising applying to the forage an effective amount of MgO in mixture with a finely divided clay. Clays which may be used include bentonite, kaolin and attapulgite. The ratio of MgO to clay should be in the range of from about 2:1 to 20:1, preferably from about 5:1 to 10:1 by weight. The mixture is easily made into a slurry for application to the pasture by spraying. A comparison of viscosities of two magnesia-water-clay suspensions at 15% MgO content showed that 5% by weight of attapulgite clay gave a viscosity equivalent to 2 percent by weight bentonite with the same amount of MgO.

The amount of solids in the slurry will vary somewhat with the particular clay used. Both the MgO and the clay should be no greater in size than 200 mesh. The use of less than 0.5% bentonite results in an unstable suspension which settles, and does not exhibit good adhesion when sprayed and allowed to dry on grass blades. The use of as much as 4% bentonite results in a suspension which does not spray well and requires high horsepower for pumping and agitation. Attapulgite appears to be equivalent in effect to bentonite in amounts about 2½ times the quantity of bentonite.

Foliar applications of MgO slurry require no period of adaptation such as may be required with mineral box supplements, and it is virtually assured that every cow will consume the Mg. The procedure is most useful under intensive grassland production practices.

Although any amount of MgO applied to the grass will have some beneficial effect, I prefer to use enough mixture to provide at least one ounce MgO per cow per day. On the assumption of a stock density of one cow per acre, the grazing rate will result in removal of all treated grass in about three weeks, after which the treatment may need to be repeated. Thus, the minimum application rate should be 20 ounces of MgO per acre per treatment. However, since some of the slurry unavoidably reaches the ground or lower portions of the grass, I prefer to apply a mixture of more than 30 pounds per acre. Application of more than 500 pounds per acre is of little additional benefit.

I do intend to be restricted to the above specific examples and illustrations. My invention may be otherwise variously practiced within the scope of the following claims.

I claim:

1. Method of combating hypomagnesemia in foraging cattle comprising applying to the pasture an effective amount of a slurry of MgO and clay in a ratio of MgO to clay of from about 2:1 to about 20:1 by weight.

2. Method of claim 1 in which the ratio of MgO to clay is about 5:1 to 10:1.

3. Method of claim 1 in which the mixture is distributed to supply at least one ounce of MgO per cow per day.

4. Method of claim 1 in which the mixture is distributed to supply at least one ounce of MgO for each 20 pounds of dry matter consumed by the cattle.

5. Method of claim 1 in which the clay is bentonite.

6. Method of claim 5 in which the bentonite is present in the slurry in an amount between 0.5 and 4 percent by weight.

7. Method of claim 1 in which the slurry is applied to the pasture by spraying.

* * * * *